United States Patent [19]

Berg et al.

[11] Patent Number: 4,836,615

[45] Date of Patent: *Jun. 6, 1989

[54] DEMOUNTABLE DISC COVERS FOR SPOKED WHEELS AND THE LIKE

[75] Inventors: Roger M. Berg; Francis H. Scott, both of Beaverton, Oreg.

[73] Assignee: Uni-BMX, Inc., Beaverton, Oreg.

[*] Notice: The portion of the term of this patent subsequent to Dec. 15, 2004 has been disclaimed.

[21] Appl. No.: 54,020

[22] Filed: May 26, 1987

Related U.S. Application Data

[63] Continuation-in-part of Ser. No. 18,796, Feb. 19, 1987, Pat. No. 4,712,838, which is a continuation of Ser. No. 811,503, Dec. 19, 1985, abandoned.

[51] Int. Cl.$^4$ .......................... B60B 7/04; B60B 7/06
[52] U.S. Cl. ............................ 301/37 SA; 301/37 R; 301/37 S
[58] Field of Search ............. 301/37 R, 37 SC, 37 SS, 301/37 SA, 37 S, 37 CD, 55, 58; 428/423.5

[56] References Cited

U.S. PATENT DOCUMENTS

| | | | |
|---|---|---|---|
| 1,167,124 | 1/1916 | Sloper | 301/37 R |
| 1,307,611 | 6/1919 | Blair | 301/37 SC |
| 4,507,413 | 3/1985 | Thoma et al. | 428/423.5 |
| 4,660,893 | 4/1987 | Huntzinger | 301/37 SA |

Primary Examiner—Johnny D. Cherry
Assistant Examiner—Joseph D. Pape
Attorney, Agent, or Firm—Jack E. Day

[57] ABSTRACT

A demountable disc cover for spoke wheels and the like. The cover is fabricated of a woven fabric impervious to the passage of air which fits over a removable hoop held inside of and adjacent to the wheel rim. The cover is fabricated with a peripheral casing having a stretch cord therein, which performs the function of holding the cover tautly on the hoop over the spoke. A multiplicity of peripheral clips holds the cover in place, each clip fitting snugly over a spoke nipple and having a gripper thereon oriented orthogonal to the spoke, which gripper fits over the edge of the hoop.

7 Claims, 1 Drawing Sheet

DEMOUNTABLE DISC COVERS FOR SPOKED WHEELS AND THE LIKE

This is a Continuation-In-Part of Application Serial No. 07/018,796, filed Feb. 19, 1987, now U.S. Pat. No. 4,712,838, which is a Continuation of Application 06/811,503 filed Dec. 19, 1985, now abandoned.

Bicycling, especially competition bicycling, has become very popular among pre- and early-teen childern. Time trials, timed course, trick- and stunt-riding, and other types of contests have spread nationwide. The present invention relates to demountable disc covers for bicycle wheels that substantially reduce air resistance on bicycles under certain circumstances, especially adult racing speeds.

Almost from the invention of the bicycle, various attempts to improve their performance have been made. Among these efforts have been those to reduce air resistance and improve appearance by covering the wheels of a bicycle with some kind of cover.

One of the earlier types of wheel cover is disclosed in Camp U.S. Pat. No. 680,224, in which generally triangularly-shaped filling pieces have grooved edges which fit between the spokes of a wheel, said filling pieces preventing mud from accumulating on the spokes and thereby adding an undesired and unnecessary load on the vehicle.

Another effort related to decorative wheel covers for bicycles is disclosed in Hamilton U.S. Pat. No. 3,082,041, wherein triangular-shaped plastic pieces having grooved edges are inserted between alternate spokes, providing a decorative effect to the vehicle. Another embodiment of this disclosure permits the triangular pieces to be mounted in an interlocking fashion so that a smooth surface is presented to the viewer.

A further development is disclosed in the Eirinberg et al U.S. Pat. No. 3,565,489, wherein a disc of paperboard, plastic or other lightweight material is formed with a slit extending in a more-or-less radial manner, and the surface of the disc is decorated with designs which may give pleasing effects when the wheel is rotated. In use, one edge of the radially slit disc is inserted between the inner and outer spokes of the wheel, and threaded thereby between the spokes so situated until the entire disc is engaged and held in place by the inner and outer spokes on the wheel. Provisions are made so that the diameter of the disc can be reduced to fit smaller, standard-sized wheels.

A still further wheel cover is disclosed in the Patane et al U.S. Pat. No. 3,602,550, wherein wheel cover plates are provided which emulate the magnesium wheels of automobiles. The plates are fabricated of planar circular plates which have a plurality of sector-shaped inserts being held together by interlocking tabs and/or capnuts provided on the covers.

Another wheel disc is disclosed in Seltman U.S. Pat. No. 4,202,582, wherein wheel discs are provided to keep riders or passengers of bicycles from catching their feet in the spokes while riding. A pair of co-acting disc members is assembled on each side of a wheel, with simple but effective fasteners holding each pair in place.

A further device of interest is disclosed in Freeman U.S. Pat. No. 3,987,409, wherein a plurality of lights is attached to the spokes of a bicycle wheel. A disc, containing a plurality of holes spaced diametrically from the axle the same distance as the lights, is mounted parallel to the plane of the wheels and slightly spaced therefrom, so that as the wheel rotates, the lights are alternately uncovered and blanked from view as they pass the spaced holes in the disc. As will be appreciated by those skilled in the art, these alternately flashing lights provide an excellent safety feature for bicycle riders at night.

Finally, a decorative feature is disclosed in Gannon British Pat. No. 1,348,663, wherein colored plastic extruded strips are slipped over the spokes and edges of the rims of bicycle wheels to provide a pleasing display when the wheels are turning.

However, none of these wheel covers and accessories offers a completely satisfactory solution to the desire for an economical, simply assembled, permanent, easily cleaned and/or changed, and attractive wheel cover acceptable to children, or to bicycle racing enthusiasts.

BRIEF DESCRIPTION OF THE PRESENT INVENTION

The present invention provides a simple answer to the desire to have an economical, rugged, simply assembled, permanent, attractive and easily cleaned and changed cover for childern's bicycle wheels. The preferred embodiment of this Continuation-In-Part application is attractive to Olympic and professional racers because it requires substantially less energy to propel when installed on a vehicle. It also offers protection, when used with a heavy weight fabric, as hereinafter explained more fully, against foreign objects, such as sticks or limbs being inserted through the spokes of the wheels.

The cover is comprised of a flexible fabric or plastic disc which contains a hoop of stiff material in a peripheral pocket, the disc being retained on the hoop by a stretch bungee cord in a peripheral seam. The disc is held tight on the hoop by drawing the cord tight after the disc has been stretched over the hoop. The disc is then mounted on the wheel by engaging the edge of the disc in small clips which are slipped over the spokes and then pressed onto the spoke nipples to provide a secure mounting. The disc can have any desired design imprinted thereon, and can be of any color. Being of fabric or flexible plastic, the disc can be demounted and easily cleaned or washed. Means are provided for adjusting the hoop circumference to accomodate slight variations in wheel circumference.

The preferred embodiment, the subject matter of this Continuation-In-Part application, is a wheel cover fabricated of a woven fabric impervious to the passage of air which, mounted on standard Olympic and professional racing bicycles, requires substantially less energy to propel at competition speeds, and which resists the intrusion of foreign objects through the spokes.

DETAILED DESCRIPTION OF THE PRESENT INVENTION

Figure 1:
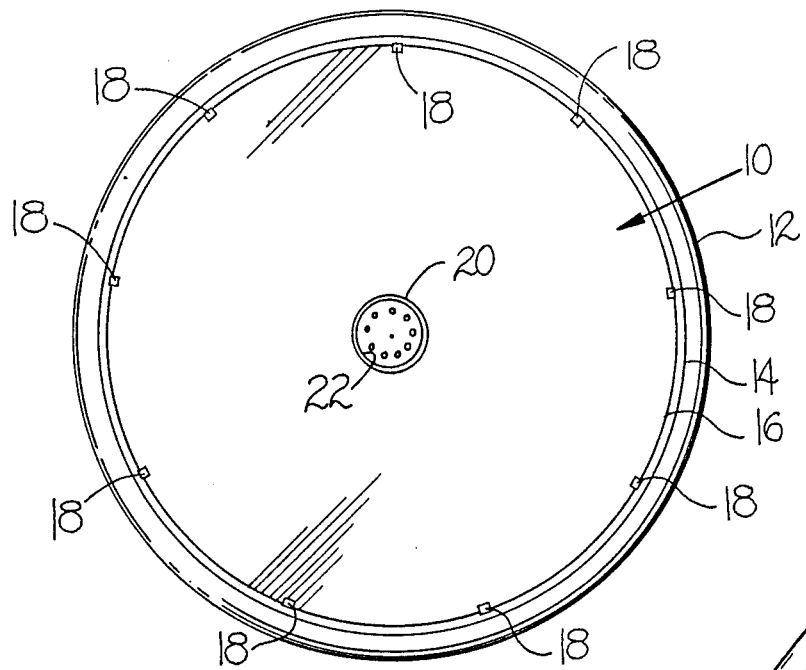
FIG. 1 discloses the appearance of a typical bicycle wheel mounting the wheel cover to the present invention.

Turning now to FIG. 1, we see the appearance of a typical bicycle wheel with the present invention 10 mounted thereon. The tire 12 is mounted on the rim 14, with the outer edge 16 of the wheel disc 10 shown being held in place by the novel clips 18. The inner edge of the wheel disc 10 of the present invention is shown at 20, and the wheel hub 22 is depicted with several spoke ends anchored thereto by the usual structure. As will be understood by those skilled in the art, the wheels of the bicycle have to be removed to mount the novel wheel disc of the present invention thereon.

In the preferred embodiment of this Continuation-In-Part application, the preferred material for the cover is a woven fabric impervious to the passage of air, for example, 70–200 denier NYLON fabric. An even heavier weave, for example, 400 denier NYLON fabric, offers substantial protection against the intrusion through the spokes of such foreign objects as sticks and limbs, while retaining the benefits of the cover with respect to speed. Urethane sizing on the fabric offers stability and protection to the fabric during cleaning processes.

Figure 2:
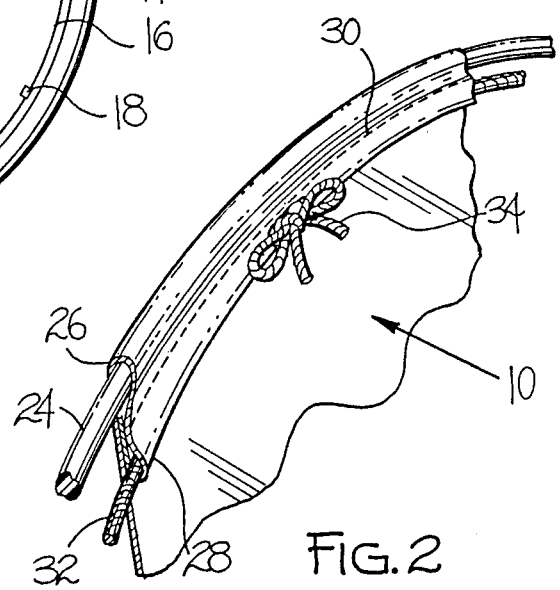
FIG. 2 discloses the structure of the hoop with the disc mounted thereon.

In FIG. 2 we see the structure of the wheel disc 10 in relation to the hoop 24 which holds the flexible cover of said wheel disc thereon. The flexible cover of said wheel disc 10 is placed over the hoop 24, hereinafter more fully described. The flexible cover 26 contains the peripherial casing 28 formed by folding it back upon itself and sewing or otherwise fastening it thereby, as shown by the stitching 30. The stretch bungee cord 32 is threaded through said peripheral or circumferential casing 28, and the ends thereof are tied in a knot, as depicted at 34, thereby encasing the hoop in a peripheral or cimcumferential pocket, as shown. When the flexible cover is fully assembled, the casing 28 containing stretch bungee cord 32 and knot 34 are facing inward on the wheel, so that the exposed face of the disc cover presents a smooth surface.

Figure 3:
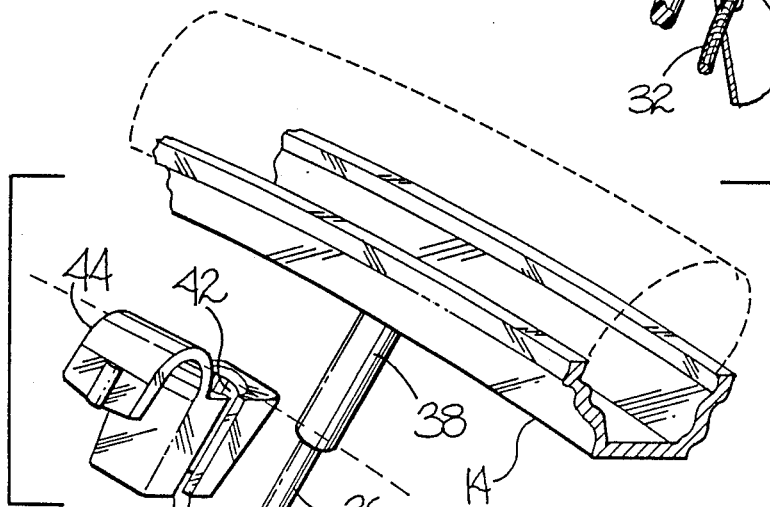
FIG. 3 discloses the structure of the mounting clip for holding the assembled disc and hoop in place.

FIG. 3 discloses novel clip means 18, together with a portion of wheel rim 14 and spoke 36 attached thereto by nipple 38. Clip means 18 has therein slot 40, which permits spoke 31 to be slipped therethrough to central passage 42, which is sized to slidingly closely fit over the nipple 38 when clip means 18 is pushed thereon. Gripper means 44 is orthogonal to passage 42 and receives the edge of hoop 24, encased in flexible cover 26. A multiplicity of said clip means is places at intervals around the wheel and provides firm support for the disc cover 10.

Figure 4:
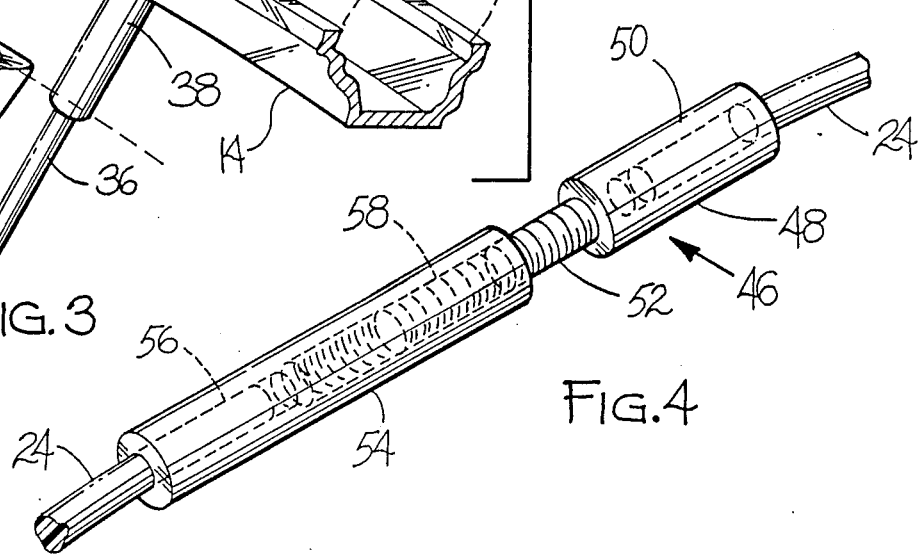
FIG. 4 discloses the preferred embodiment of adjusting means, for adjusting the circumference of the mounting hoop.

FIG. 4 discloses adjustment means 46. First sleeve means 48 has first axial bore 50 (shown in dotted outline) into which first end of the hoop 24 slidingly fits. The other end of sleeve means 48 contains threaded screw 52. Second sleeve means 54 has a second axial bore 56 into which the second end of hoop 24 slidingly fits, as shown. The other end of sleeve means 54 has therein third axial bore 58, threaded to receive screw 52 of first sleeve means 48. When the ends of hoop 24 are inserted into first and second axial bores 50 and 56, respectively, threaded portion 58 can be used to adjust the circumference of hoop 24 to fit the multiplicity of gripper means 44 which hold the disc cover in place.

The mechanism of the preferred embodiment in requiring reduced energy to propel a bicycle at high speeds is not completely understood. Dynamometer tests, comparing uncovered spoked wheels rotating at a speed equivalent to 40 miles per hour, with wheels incorporating the covers of the preferred embodiment, have repeatedly demonstrated a 40% decrease in energy required to turn the covered wheels and a 3 mile per hour increase in equivalent wheel speed. Surprisingly, similar tests, under the same conditions, with LYCRA fabric, which is more porous and permits air to pass easily, show an approximate 40% increase in required energy over uncovered wheels, with a decrease in wheel speed of 3 miles per hour.

It is speculated that two effects are possibly at work:
1. the principal effect may be that impervious fabric deflects air around the wheel, permitting it to "slice" through the air and use less energy, rather than drawing the air into the spokes where it is "churned", with the attendant resistance and turbulence requiring more energy; and/or
2. the slight roughness of the woven texture of the cloth surface may create a "surface", similar to that which has been noted on boat hulls, automobile bodies and aircraft surfaces, thereby reducing friction.

Whatever the explanation, it will be seen by those skilled in the art that the present invention offers an economical, rugged, easily assembled, permanent, attractive, and easily changed and cleaned cover for the wheels of bicycles, especially, in the case of the preferred embodiment of this Continuation-In-Part application, of amateur and professional racing bibycles, and of those who ride where foreign objects may be thrown up into the spokes.

There are many variatiness that could be made without departing from the spirit and intent of the present invention. Hoop 24 could be made of an appropriate springy metal or other material. The preferred embodiment is a fiberglass rod. Adjustment means 54 could be metal or plastic, with brass being the preferred embodiment. Disc cover 10 could be any of several fabrics, or even a flexible plastic material, but it has been found that the material to be used for the front, or steering, wheel of a bicycle, should be a loosely woven mesh, as otherwise gusts of wind can cause steering problems. A closely woven cloth or canvas is appropriate for the rear wheel cover. The preferred embodiment of this Continuation-In-Part application, is a woven cloth impervious to the passage of air, for example, 70–400 denier NYLON fabric, at least for the rear wheel. Such fabric can also can be used for a front wheel cover, if the vehicle is to be used by professionals who have strong arms and who are aware of the hazards of gusty winds when using a front wheel cover. Resilient bungee cord 32 could be replaced by a spring, a rubber ring, or other appropriate means of keeping a tension on the cover so as to present a smooth surface.

The terms and expressions which have been employed in the foregoing description are used therein as terms of description and not of limitation, and there is no intention, in the use of such terms and expressions, of excluding equivalents of the features shown and described or portions thereof, it being recognized that the scope of the invention is defined and limited only by the claims which follow.

What we claim as our invention is:

1. A demountable disc cover for a bicycle wheel having a rim, an axle, and a multiplicity of spokes interconnected therebetween, consisting essentially of:
   a. hoop means of substantially the circumference of said rim but fitting inside thereof, said hoop means being of relatively stiff springy material and having circumferential adjustment means therein;
b. cover means fabricated of a woven fabric impervious to the passage of air therethrough, removably fitting over said hoop means, and having:
1. an axial opening therein to receive said axle; and
2. a circumferential casing thereon;
c. a loop of stretch cord of less length than said circumference threaded in said casing;
d. a multiplicity of fastening means:
1. removably affixed to said spokes; and
2. removably holding said hoop means adjacent said rim.

2. The demountable disc cover of claim 1, wherein said hoop means has a first end and a second end, and said circumferential adjustment means consists essentially of:
a. first sleeve means having a first axial bore in a first end and an axial screw on a second end;
b. second sleeve means having a second axial bore in a third end and a third axial bore in a fourth end, said third axial bore having therein threads to rotatingly engage said axial screw; and
c. said first and said second axial bores slidingly receiving therein said first and said second ends of said hoop, respectively.

3. The demountable disc cover of claim 1, wherein said fastening means consists essentially of:
a. clip means slidingly removably fitting over the end of said spokes adjacent said rim; and
b. gripper means orthogonal to said clip means for removably gripping said hoop means with said circular cover fitted thereon.

4. The demountable disc cover of claim 2, wherein said fastening means consists essentially of:
a. clip means slidingly removably fitting over the end of said spokes adjacent said rim; and
b. gripper means orthogonal to said clip means for removably gripping said hoop means with said circular cover fitted thereon.

5. In the demountable disc cover of claims 1, 2, 3 or 4 the improvement wherein said woven fabric is 70–400 denier NYLON fabric.

6. In the demountable disc cover of claim 1, 2, 3 or 4 the improvement wherein said woven fabric is 70–200 denier NYLON fabric.

7. In the demountable disc cover of claims 1, 2, 3 or 4 the improvement wherein said woven fabric is 400 denier NYLON fabric.

* * * * *